(12) United States Patent
Schnitzler et al.

(10) Patent No.: US 10,234,671 B2
(45) Date of Patent: Mar. 19, 2019

(54) MICROSCOPE WITH SELF-ADAPTING IRIS DIAPHRAGM

(71) Applicant: LEICA MICROSYSTEMS (SCHWEIZ) AG, Heerbrugg (CH)

(72) Inventors: Harald Schnitzler, Lüchingen (CH); Georg Schlaffer, Heerbrugg (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 19 days.

(21) Appl. No.: 15/515,629

(22) PCT Filed: Oct. 1, 2015

(86) PCT No.: PCT/EP2015/072661
§ 371 (c)(1),
(2) Date: Mar. 30, 2017

(87) PCT Pub. No.: WO2016/055338
PCT Pub. Date: Apr. 14, 2016

(65) Prior Publication Data
US 2017/0307868 A1  Oct. 26, 2017

(30) Foreign Application Priority Data
Oct. 6, 2014 (DE) .................. 10 2014 114 471

(51) Int. Cl.
*G02B 21/36* (2006.01)
*G02B 21/24* (2006.01)
*G02B 21/02* (2006.01)

(52) U.S. Cl.
CPC ......... *G02B 21/365* (2013.01); *G02B 21/025* (2013.01); *G02B 21/24* (2013.01); *G02B 21/241* (2013.01)

(58) Field of Classification Search
CPC ... G02B 21/365; G02B 21/025; G02B 21/241
USPC .................. 359/368, 379, 380, 432
See application file for complete search history.

(56) References Cited

U.S. PATENT DOCUMENTS

| 7,924,502 B2 * | 4/2011 | Weiler | G02B 21/025 359/368 |
| 8,000,004 B2 * | 8/2011 | Kuster | G02B 21/025 359/368 |
| 2002/0030883 A1 | 3/2002 | Adachi et al. | |
| 2005/0168809 A1 | 8/2005 | Moller et al. | |

(Continued)

FOREIGN PATENT DOCUMENTS

| DE | 102005047593 A1 | 4/2007 |
| DE | 102009012707 A1 | 9/2010 |

(Continued)

*Primary Examiner* — Frank G Font
(74) *Attorney, Agent, or Firm* — Hodgson Russ LLP (57) ABSTRACT

The invention relates to a microscope (10) that encompasses an objective system (30) and a zoom system (32). The microscope furthermore has a diaphragm (60) for limiting the aperture of the beam path. A control unit (64) is furthermore provided, that control unit (64) automatically ascertaining, as a function of the current manifestation of at least one parameter of the microscope (10), a respective setting of the diaphragm (60) predetermined for the current manifestation, and setting the diaphragm (60) accordingly.

14 Claims, 6 Drawing Sheets

(56) References Cited

U.S. PATENT DOCUMENTS

| | | | |
|---|---|---|---|
| 2008/0151243 A1* | 6/2008 | Seyfried | G02B 21/0064 356/326 |
| 2009/0002812 A1* | 1/2009 | Kuster | G02B 21/025 359/385 |
| 2009/0002814 A1* | 1/2009 | Weiler | G02B 21/025 359/389 |
| 2009/0021827 A1* | 1/2009 | Chong | G02B 21/025 359/389 |
| 2012/0002274 A1* | 1/2012 | Knoblich | G02B 21/24 359/380 |
| 2012/0200905 A1* | 8/2012 | Paulus | G02B 21/025 359/230 |
| 2013/0242407 A1* | 9/2013 | Wacke | G02B 21/025 359/659 |

FOREIGN PATENT DOCUMENTS

| | | |
|---|---|---|
| DE | 102010030637 A1 | 12/2011 |
| DE | 102010045860 A1 | 3/2012 |
| DE | 102010042351 A1 | 4/2012 |
| DE | 102011114336 A1 | 3/2013 |
| JP | H07248450 A | 9/1995 |
| JP | H0921957 A | 1/1997 |
| JP | 2005128443 A | 5/2005 |
| JP | 2007309976 A | 11/2007 |
| JP | 2009294340 A | 12/2009 |
| JP | 2010054704 A | 3/2010 |

* cited by examiner

MICROSCOPE WITH SELF-ADAPTING IRIS DIAPHRAGM

CROSS-REFERENCE TO RELATED APPLICATIONS

The present application is the U.S. national phase of International Application No. PCT/EP2015/072661 filed Oct. 1, 2015, which claims priority of German Application No. 10 2014 114 471.6 filed Oct. 6, 2014, the entire disclosure of which is incorporated herein by reference.

FIELD OF THE INVENTION

The invention relates to a microscope that encompasses an objective system which comprises at least two objectives, selectably introducible into the beam path, having different focal lengths. The microscope furthermore has a zoom system that has a zoom range, the respective total magnification of an object to be examined microscopically resulting respectively from the focal length of the selected objective and from the zoom system focal length set within the zoom range.

The microscope furthermore comprises a diaphragm for limiting the aperture of the beam path, the size of the opening of the diaphragm, and thus the aperture, being settable by adjustment of the diaphragm.

BACKGROUND OF THE INVENTION

Known microscopes comprise objective systems and/or zoom systems with which the focal length, and thus the total magnification of the image of an object to be examined microscopically, can be set. Depending on which objective of the objective system is selected, and depending on the setting of the zoom system, a different ideal setting of the aperture of the microscope is needed in order to achieve optimum images. An iris diaphragm is therefore provided in order to set the aperture, with which diaphragm the size of the opening can be adjusted, thereby modifying the aperture accordingly.

With many known microscopes it is furthermore possible to exchange hardware components, for example cameras that are used, thereby once again resulting in different ideal apertures.

With many microscopes it is also possible for the user to be able to set different preferences in terms of various parameters, once again resulting, as a function of the various preferences, in different ideal apertures for acquiring high-quality images.

Microscopes in which the setting of the diaphragm is accomplished manually via corresponding actuation elements are known. Also known are microscopes in which the diaphragm is adjusted in motorized fashion. The two variants have in common the fact that the user of the microscope must adapt the diaphragms in accordance with the respectively selected settings of the microscope, and that no adjustment of the diaphragm occurs without a corresponding actuation by the user.

This is disadvantageous in that the user requires corresponding technical knowledge in order to select the respective ideal setting of the diaphragms. Setting of the diaphragm is furthermore time-consuming, and can quickly be subject to errors.

Also known are microscopes in which an iris diaphragm is provided, which is mechanically coupled to the zoom system in such a way that the diaphragm is automatically also adjusted accordingly as a function of the zoom position that is set.

This is disadvantageous in that a mechanical coupling of this kind is possible only for one respective parameter and, for example, cannot be carried out for the use of different objectives selectably introducible into the beam path. In addition, such mechanical couplings do not allow an intervention by the user of the microscope, for example in order to adapt settings to personal preferences.

SUMMARY OF THE INVENTION

The object of the invention is to describe a microscope with which high-quality images of the object to be examined microscopically can be obtained in simple fashion and with little operating complexity.

This object is achieved with a microscope having the features described herein. Advantageous refinements of the invention are also described herein.

According to the present invention a control unit for controlling the diaphragm is provided, with the aid of which unit the optimum setting of the diaphragm is respectively ascertained and the diaphragm is set accordingly. For this, the control unit automatically ascertains, as a function of the current manifestation of at least one parameter of the microscope, a setting of the diaphragm which is respectively ideal for the current manifestation, and sets the diaphragm accordingly. What is achieved thereby is that the optimum setting of the diaphragm, and thus of the aperture of the microscope, is automatically set in each case, and that upon a change in the implementation of a parameter of the microscope the operator does not him- or herself need to laboriously ascertain and set the ideal setting of the diaphragm. The result is that operating convenience is increased, training time and the expert knowledge required by the user are reduced, and incorrect operation is prevented.

Expressed differently, the "current manifestation" is the current value or current setting of the parameter. The parameter is, for example, one or more parameters from the following group that encompasses at least: setting of the zoom system, objective being used, and/or current user setting.

In particular, a motor can be provided for adjusting the diaphragm, the control unit automatically applying control to the motor in such a way that it sets the diaphragm accordingly.

What is achieved in addition is that thanks to the motorization and automatic application of control, the size of the opening of the diaphragm can be very precisely and accurately controlled as a function of at least one parameter of the microscope. The ideal aperture can thus be respectively set in simple fashion for each possible setting of the microscope.

This furthermore makes possible so-called "digital fusion optics," in which images of an object are acquired in quick succession at different apertures (and thus resolutions) and are overlaid to yield one image. In particular, a scan is accomplished for this purpose in order to determine the "better" regions of each image, which are then assembled into one master image.

The diaphragm is in particular an iris diaphragm with which the size of its opening can be varied in simple fashion. Iris diaphragms of this kind are of simple and robust construction, and allow accurate setting of the aperture in simple fashion.

Alternatively, instead of an iris diaphragm an aperture limiter having a plurality of electronically controllable segments can also be provided as a diaphragm. In particular, the transmissivity or reflectivity of each segment of the electronically controllable segments can be individually controllable.

The aperture limiter is preferably a liquid crystal matrix having a two-dimensional grid of LCD segments. The aperture limiter is therefore also referred to as an "LC shutter."

In a particularly preferred embodiment the control unit respectively ascertains the predetermined ideal setting of the diaphragm as a function of the current manifestation of at least two parameters of the microscope, and applies control to the motor in such a way that it sets the diaphragm accordingly.

In a particularly preferred embodiment more than two parameters can also be automatically taken into consideration in the determination of the ideal setting of the diaphragm. In particular, all parameters of the microscope which can be adjusted by the operator are taken into consideration, so that depending on which settings he or she makes, he or she him- or herself never needs to modify the setting of the diaphragm in order to obtain a high-quality image.

The settings of the diaphragm which are to be set have, in particular, previously been ascertained experimentally and/or computationally, and have been selected in such a way that with them, a high-quality image of the object to be examined microscopically, in particular the image optimally adapted to the respective setting, is respectively obtained.

It is particularly advantageous if, for all possible manifestations of the parameters taken into consideration and also for all possible combinations of the manifestations of the parameters, that setting of the diaphragm which is to be set is respectively stored in the control unit in a manner unequivocally allocated to the respective manifestations. The control unit, when ascertaining that setting of the diaphragm which is to be set, then reads out the corresponding setting value of the diaphragm as a function of the current manifestation of the parameter to be taken into consideration, and applies control to the motor accordingly. In particular, a table in which the values of the diaphragm which are to be set accordingly for all possible manifestations and combinations thereof is stored in the control unit.

In an alternative embodiment of the invention a calculation specification can also be stored in the control unit, the control unit ascertaining, with the aid of this calculation specification, that setting of the diaphragm which is respectively to be set. This calculation specification contains, in particular, the parameters whose manifestations are to be taken into consideration, so that as a function of the manifestation of the respective parameters, the required ideal setting of the diaphragm is obtained as a result of the calculation specification.

The calculation specification in particular has previously been ascertained with the aid of simulations and equalization functions.

The settings that are respectively to be set for the diaphragm are selected, in particular, in such a way that they are respectively the optimum settings of the diaphragm for the respective manifestation of the parameters or combination thereof, i.e. so that the optimum aperture for the selected manifestations of the parameters is obtained.

The settings of the diaphragm which are to be set can be stored directly as required setting parameters of the diaphragm, required control application data for the motor, an aperture to be set, and/or a size of the opening of the diaphragm which is to be set. These values can be converted arbitrarily into one another, so that the manner in which they are stored is immaterial.

In a particularly preferred embodiment of the invention the control unit ascertains, as a function of the current setting of the zoom system, that setting of the diaphragm which is to be set, and automatically sets the diaphragm accordingly. In this case the parameter taken into consideration in the context of diaphragm setting is therefore the zoom setting, and the current manifestation is the respective current setting of the zoom system.

What is thereby achieved is that an ideal aperture profile over the entire zoom range can be achieved with no need for the operator to laboriously ascertain the respective setting required. In particular, the adaptation of the setting of the diaphragm to the selected setting of the zoom can thus not be forgotten.

The advantage achieved as compared with systems having a mechanical coupling between the zoom setting and the aperture setting is that the system is of substantially simpler construction. In addition, automatic electrical setting of the respective diaphragm setting allows further parameters to be taken into consideration in addition to the zoom setting.

In a particularly preferred embodiment of the invention, the objective currently introduced into the beam path is also, additionally or alternatively, taken into consideration in determining the setting of the diaphragm. A different ideal aperture is obtained depending on the objective used, so that the diaphragm must be correspondingly adjusted; this is achieved in simple fashion by taking the selected objective into consideration as a parameter when ascertaining the diaphragm setting.

It is furthermore advantageous if the control unit ascertains, as a function of at least one property of at least one hardware component of the microscope, that setting of the diaphragm which is to be set. What is achieved thereby is that even better adaptation of the aperture of the microscope to the setting respectively being used is accomplished. In particular, various hardware components of the microscope, for example the image sensor being used, can be exchanged, thereby yielding a different ideal aperture due to the different resolutions and sensitivity values of the image sensor.

The control unit ascertains that setting of the diaphragm which is to be set in particular as a function of the resolution of an image sensor of the microscope, the sensitivity of an image sensor of a microscope, the resolution of a camera of the microscope, and the sensitivity of a camera of the microscope.

It is also advantageous if the control unit ascertains, as a function of at least one user setting of a user of the microscope, that setting of the diaphragm which is to be set. In particular, the microscope is embodied in such a way that the user can select preferences and settings. These user settings can be, for example, the desired exposure time, a desired one of several resolution levels, a desired one of several predefined depth-of-focus levels, or a desired one of several predefined brightness levels. A different ideal aperture results depending on the setting that is selected. What is achieved as a result of automatic adaptation is in particular that the user does not need to laboriously convert his or her preferences into the required diaphragm settings, but instead he or she can select the desired preferences via a menu in clear text, and the microscope automatically carries out all the required settings.

For example, via a computer connected to the microscope, a selection menu can be predefined in which the user can select as a preference, for example, "constant brightness," "expanded resolution," "better resolution," "greater depth of focus," etc. In order to arrive at this setting, the diaphragm setting must be modified accordingly; this is accomplished automatically by the control unit.

In a particularly preferred embodiment of the invention, several or all of the parameters recited above, i.e. in particular the zoom setting, the objective being used, properties of hardware components, and/or the user settings, are taken into consideration in ascertaining the diaphragm setting and the automatic implementation of that setting. This is made possible by the fact that setting of the diaphragm is accomplished in electronically controlled fashion. With mechanical setting of the diaphragm it is only ever possible to target one parameter, whereas automatic setting via the control unit, i.e. the firmware of the microscope, allows any number of parameters, in any combinations, to be considered.

It is particularly advantageous if at least one sensor unit is provided for ascertaining the current manifestation of the parameter or the current manifestations of the parameters. This is necessary in particular if one of the parameters can be set manually, so that the control unit knows which setting has currently been performed. With the microscope, for example, the objective system can be adjusted manually and entirely mechanically, so that initially no electronic information regarding the respective setting is available. In this case in particular, sensors are then provided with which the setting can be unequivocally ascertained.

Conversely, it is not obligatorily necessary to provide sensors when electric zoom setting systems and objective setting systems are used, since the respective electrical control signals used in the context of zoom setting or objective setting can be utilized to ascertain the diaphragm setting.

In a particularly preferred embodiment of the invention a zoom sub-range within the zoom range is allocated to each of the objectives, limiting means being provided with which the adjustability of the zoom system is respectively limited to the zoom range that is allocated to the selected objective. In this case the control unit ascertains the predetermined setting of the diaphragm as a function of the respectively selected objective and/or of the focal length of the zoom system which is set.

The result of using a zoom system that is dimensioned to be larger than would actually be necessary for the desired zoom factor is that the differences in the focal lengths of the objectives that are used do not need to be as great as in conventional microscopes. What can be achieved in particular by allocating zoom sub-ranges is that with high-magnification objectives a high total magnification is also produced by the zoom system, and this thus interacts for a maximally high magnification. With low-magnification objectives, on the other hand, the zoom sub-range within the total zoom range is selected in such a way that it also corresponds to a lower magnification, so that wide field angles are achieved. The result of the allocated zoom sub-range is thus that the zoom system is respectively adapted to the individual requirements of the respective objective, so that less stringent requirements can correspondingly be applied to the construction of the objectives and, in particular, objectives having focal lengths more closely adjacent to one another can be used. The result of this is that the objectives can be constructed to be more compact and thus more inexpensive. In particular, objectives having more similar dimensions can thereby be used, in particular enabling a parfocal objective system. The result of such a parfocal embodiment of the objective system is in turn that refocusing is not necessary upon an objective change. It furthermore becomes possible to achieve a comparatively large zoom factor. The accompanying advantage is that, in particular, what results for the operator is a zoom factor that in fact remains the same for each objective.

The "total zoom range" of the zoom system is understood in particular as the physically constrained maximum available zoom range. The total zoom range indicates in particular the various focal lengths that can be set by way of the zoom system. The limits of the total zoom range are thus defined by a minimum focal length and a maximum focal length of the zoom system.

The objective system encompasses in particular an objective turret in which the various objectives are mounted, and by rotation of which the desired objective can be respectively introduced into the beam path. The objectives themselves are embodied in particular in such a way that the respective mutual arrangement therein of the individual lens groups is permanently defined and not adjustable. The zoom system, conversely, comprises several lens groups at least one of which is axially movable relative to the immovable lens groups, with the result that the focal length of the zoom system, and thus its magnification, can be adjusted.

Preferably a second zoom sub-range within the total zoom range is also allocated to the second objective.

In a preferred embodiment the zoom sub-range of at least one objective is narrower than the total zoom range. It is particularly advantageous if the zoom sub-ranges of all the objectives are respectively narrower than the total zoom range of the zoom system. For each objective, only that respective sub-range of the total zoom range which matches, in terms of its properties, the properties of the objective is then respectively used for each objective.

Because the total zoom range of the objective is thus wider than the zoom sub-ranges that are used for the individual objectives, the zoom system is also referred to as "overdimensioned" or "oversized."

The zoom sub-ranges of the objectives can also at least partly overlap. Alternatively, it is also possible for the zoom sub-ranges to be selected in such a way that no overlaps occur. The result of the overlap of the zoom ranges is that each objective has a maximally wide adjustment range thanks to the corresponding setting of the focal length of the zoom system, and the magnification can accordingly be widely varied.

In a preferred embodiment of the invention the upper and lower limits of the zoom sub-ranges are respectively selected in such a way that in the various zoom sub-ranges the same predetermined zoom factor is obtained in each case between the respective lower and upper limit. The "zoom factor" is understood in particular as the quotient of the upper and the lower limit, i.e. in particular the quotient of the maximum focal length and minimum focal length, for the respective zoom sub-range. The result thereby achieved is that the same zoom factor is available to the operator for each objective, so that the operator has the same magnification capability regardless of which objective he or she is using, although different total magnifications will of course result depending on the objective used, since they result from the quotient of the focal length of the zoom system divided by the focal length of the objective.

It is advantageous in particular if the lower limit of at least one zoom sub-range corresponds to the lower limit of the total zoom range, and the upper limit of at least one zoom sub-range corresponds to the upper limit of the total zoom range. What is achieved thereby is that the total zoom range of the zoom system is optimally utilized, and that the resulting total zoom factor of the microscope is also as large as possible.

It is particularly advantageous if the zoom sub-ranges are preset in such a way that the zoom sub-range of an objective having a focal length that is longer than the focal length of another objective encompasses magnifications or focal lengths that are lower or shorter than the lowest magnification or shortest focal length of the zoom sub-range of that other objective. If the one objective has a longer focal length than the other objective, this means that that objective produces a lower magnification than the other objective. The zoom sub-range is thus selected in such a way that, relative to the total zoom range, it covers the shorter focal lengths of the zoom sub-range, so that the properties of the objective and of the zoom system, in particular the desired wide field angle at low magnifications, optimally complement one another.

Conversely, the zoom sub-ranges are preset in such a way that the zoom sub-range of an objective having a focal length that is shorter than the focal length of another objective encompasses magnifications or focal lengths that are higher or longer than the highest magnification or longest focal length of the zoom sub-range of another objective. The result thereby achieved is that for objectives having a high magnification, the zoom sub-range also covers the long focal lengths of the total zoom range and thus contributes to a higher total magnification.

In a particularly preferred embodiment of the invention the objective system has a first objective having a first focal length and a second objective having a second focal length, the second focal length being longer than the first focal length. The second objective thus results in a lower magnification than the first objective. The total zoom range has a third focal length as a lower limit and a fourth focal length as an upper limit. The first zoom sub-range allocated to the first objective has the fourth focal length as an upper limit, and the second zoom sub-range allocated to the second objective has the third focal length as a lower limit. The result thereby achieved is that the first objective, which has the higher magnification of the two objectives, achieves a maximum total magnification when the fourth focal length is set together with the zoom system. Conversely, a minimum magnification can be achieved by selecting the second objective and the third focal length.

The focal lengths can also be selected, in particular, in such a way that with corresponding settings, the total magnifications that result are less than 1, i.e. objects are imaged smaller.

It is furthermore advantageous if limiting means are provided, with which the adjustability of the zoom system is respectively limited to the zoom sub-range that is allocated to the selected objective, i.e. to the objective that is currently introduced into the beam path.

In a particularly preferred embodiment of the invention, at least one stop is provided as a limiting means on each objective, the adjustability of the zoom system being limited by the stop to the zoom sub-range respectively allocated to that objective. The result is, in particular, to ensure in entirely mechanical fashion that for each objective, an adjustment of the zoom system is possible only within the allocated zoom sub-range.

In a particularly preferred embodiment, two stops, by which the adjustment of the zoom system is limited, are provided on each objective. If one limit of the zoom sub-range is defined by a limit of the physically constrained maximum possible total zoom range, a stop can be omitted at that end.

In a particularly preferred embodiment of the invention the adjustment of the zoom system can also be accomplished electrically by the fact that an electric drive unit, in particular a motor, is provided. A control unit for applying control to the drive unit is also provided, the sub-ranges allocated to the respective objectives being stored in that control unit. The control unit then applies control to the drive unit in such a way that an adjustment is possible in each case only within the respective zoom sub-range. In particular, a sensor suite is provided with which the control unit can automatically detect which objective is introduced into the beam path, so that the control unit then automatically selects the zoom sub-range settable by the operator and applies control accordingly to the electric drive unit. In this case it is possible in particular to omit mechanical stops for limiting the zoom sub-range, since the application of control to the electric drive unit serves as a limiting means.

It is furthermore advantageous if the microscope encompasses an actuation element for manually setting the magnification factor of the zoom system. This actuation element can be a rotary knob.

It is furthermore advantageous if the zoom system comprises at least two lens groups, one of which is movable in the direction of the optical axis in order to set the focal length of the zoom system. In a preferred embodiment the zoom system comprises three or four lens groups, two of which are movable in the direction of the optical axis.

The microscope is, in particular, a digital microscope that encompasses an image capture unit for acquiring images of the object to be examined microscopically. In the digital microscope, the image of the object to be examined microscopically is, in particular, imaged via the zoom system directly onto the image capture unit.

An alternative embodiment can also involve visual microscopes.

BRIEF DESCRIPTION OF THE DRAWING VIEWS

Further features and advantages of the invention are evident from the description below, which explains the invention in more detail with reference to exemplifying embodiments in conjunction with the attached Figures, in which.

DETAILED DESCRIPTION OF THE INVENTION

Figure 1:
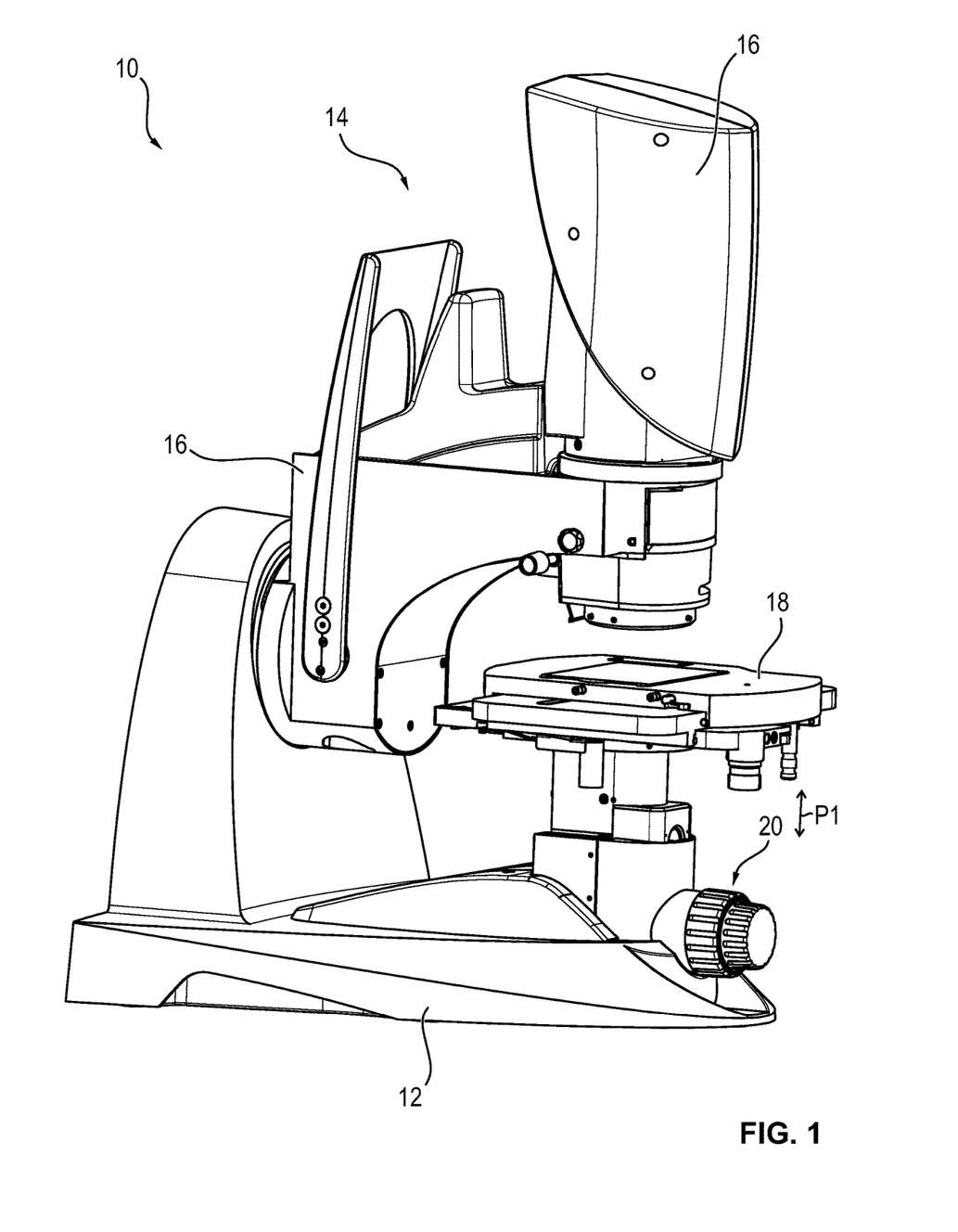
FIG. 1 is a schematic perspective depiction of a digital microscope.

FIG. 1 is a schematic perspective depiction of a digital microscope. Microscope 10 encompasses a stationary stand body 12 as well as a pivoting unit 14 pivotable relative thereto.

Pivoting unit 14 encompasses at least one image capture unit with which an image of the objects to be examined microscopically can be acquired. In particular, by way of this image capture unit not only individual images but also videos can be acquired, making it possible to observe the object to be examined microscopically from different angles of view.

The pivoting unit furthermore comprises an objective and a zoom system with which different magnifications of the objects to be examined microscopically can be set. The objective system has a plurality of objectives, one of which is respectively introduced selectably into the beam path.

The image capture unit, the objective system, and the zoom system are not visible in FIG. 1, since they are concealed by housing 16 of pivoting unit 14.

The construction of the objective system and of the zoom system will be described in further detail below in conjunction with FIGS. 2 and 4.

The objectives of the objective system are embodied, in particular, parfocally, so that no refocusing needs to be performed by the operator upon an objective change. The objectives are matched in particular to the distance between the rotation axis, around which pivoting unit 14 can be rotated, and the interface of the objectives, thus yielding a eucentric system the consequence of which is that refocusing does not need to occur upon pivoting of pivoting unit 14, and the region being viewed furthermore remains centered in the middle of the image.

Also arranged on the stand body is a specimen stage 18 on which the objects to be examined microscopically are mounted. This specimen stage 18 can be adjusted, with the aid of positioning wheels 20, relative to stand body 12 in the direction of double arrow P1, thus allowing the objects to be examined microscopically to be focused.

Figure 2:
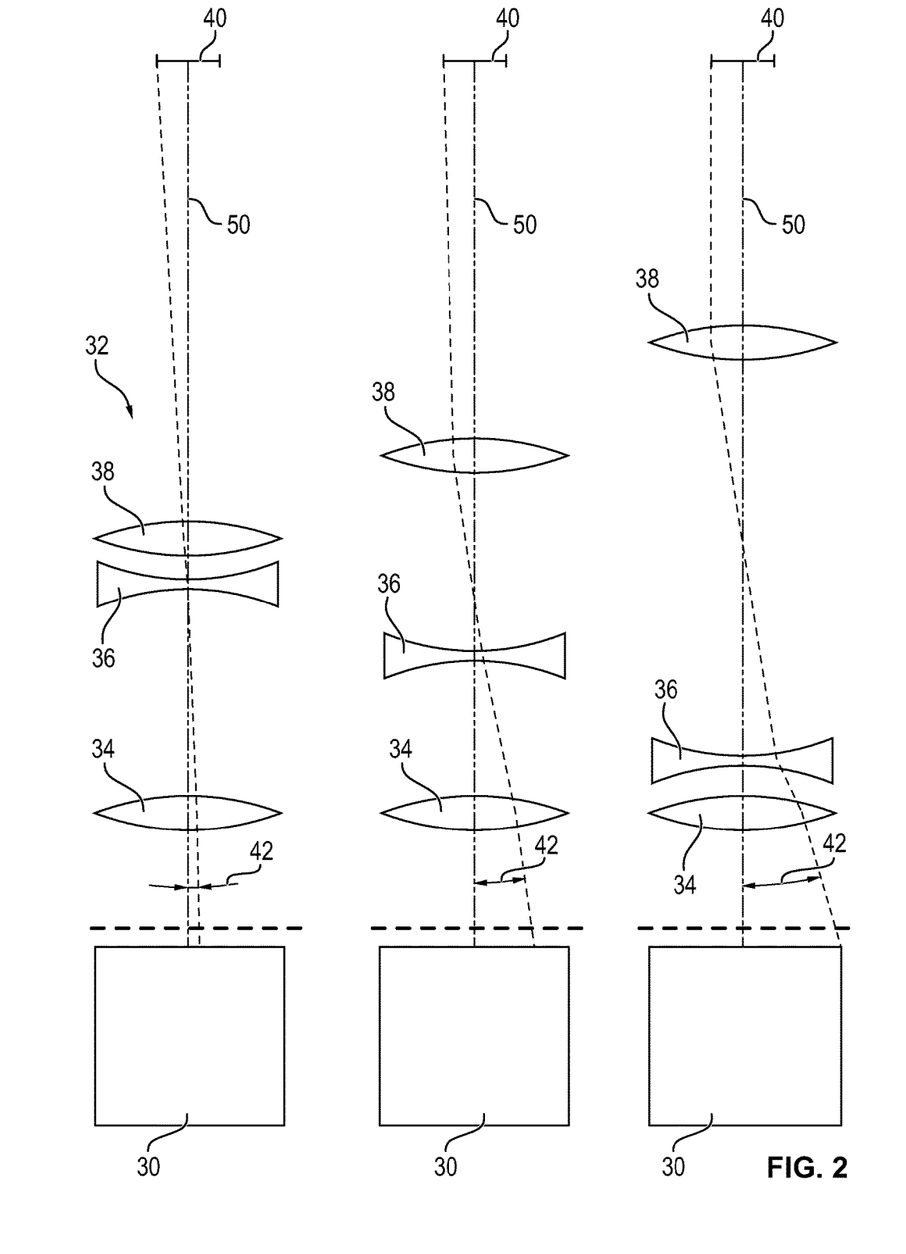
FIG. 2 schematically depicts a magnification system of the microscope according to FIG. 1.

FIG. 2 shows, entirely schematically, the magnification system arranged in pivoting unit 14 in three different settings. The magnification system encompasses an objective system 30 as well as a zoom system 32, the interaction of which causes the desired total magnification to be achieved. Objective system 30 encompasses at least two objectives 44, 52 having different focal lengths, one of which is respectively pivoted selectably into the beam path of microscope 10.

Zoom system 32 comprises three lens groups 34 to 38, two lens groups 36, 38 of which are adjustable in the direction of optical axis 50. In an alternative embodiment of the invention the zoom system can also encompass only two lens groups 34 to 38, only one lens group 34 to 38 of which is axially adjustable. Zoom systems having more than three lens groups 34 to 38 are also conceivable.

In the embodiment shown in FIG. 2, the image of the object is imaged via zoom system 32 directly onto an image capture unit 40 that can be, in particular, a camera.

FIG. 2 shows three settings of zoom system 32. In the left setting, zoom system 32 is set so that it has a maximum focal length and thus produces a maximum magnification. Field angle 42, which indicates the angle of the main beam with respect to optical axis 50 in the region of the interface to objective system 30, is correspondingly minimal.

The right setting depicted in FIG. 2, conversely, shows the other extreme setting of zoom system 32, namely the setting in which zoom system 32 has a minimum focal length and correspondingly produces a minimum magnification effect. In this case field angle 42 is maximal.

The middle case shown in FIG. 2 represents an intermediate position in which zoom system 32 achieves a focal length that is longer than the minimum focal length and shorter than the maximum focal length. Field angle 42 is correspondingly between field angles 42 of the other two cases.

The respective total magnification of microscope 10 results from the quotient of the focal length set for zoom system 32, and the focal length of that objective 44, 52 of objective system 30 which is introduced into the beam path.

Figure 5:
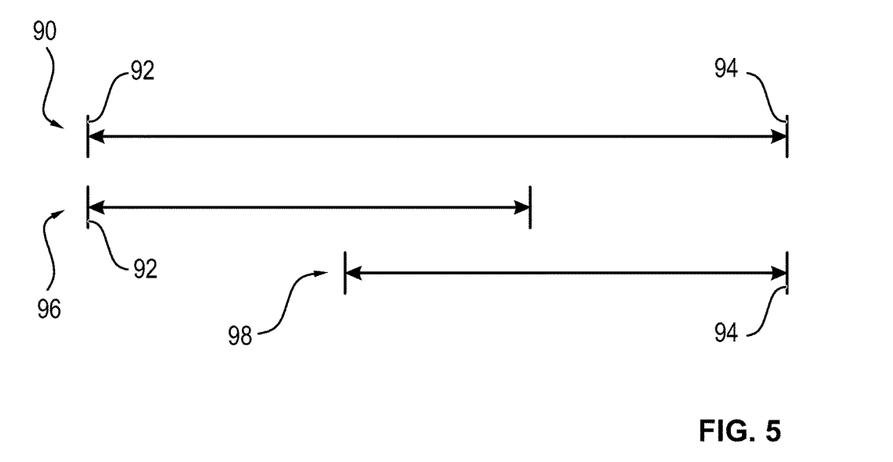
FIG. 5 schematically depicts a zoom range and the zoom sub-ranges of the first and the second objective.

Zoom system 32 has a total zoom range that indicates which focal lengths of zoom system 32 can be set via zoom system 32. This total zoom range is depicted in FIG. 5 by way of example by arrow 90, lower limit 92 indicating the minimum focal length of zoom system 32 that is produced for the setting shown on the right in FIG. 2. Upper limit 94 of total zoom range 90 correspondingly indicates the maximum focal length of zoom system 32 which is produced for the setting shown on the left in FIG. 2. Total zoom range 90 is thus predefined, in particular, in physically constrained fashion, and indicates the maximum possible range of magnifications of zoom system 32.

As already described, objective system 32 encompasses several objectives 44, 52 having different focal lengths. A zoom sub-range within total zoom range 90 is allocated to each of these objectives 44, 52, a first zoom sub-range 96 for a first objective 44 and a second zoom sub-range 98 of a second objective 52 being depicted in FIG. 5. The two zoom sub-ranges 96, 98 each cover only a portion of total zoom range 90, and in particular are configured in such a way that they at least partly overlap.

Microscope 10 is embodied in such a way that zoom system 32 is always respectively adjustable only within the respective zoom sub-range 96, 98 that is allocated to objective 44, 52 currently pivoted into the beam path.

In the exemplifying embodiment depicted in FIG. 5, first objective 44 to which zoom sub-range 96 is allocated has a longer focal length compared with second objective 52, and thus a lesser magnification effect. First zoom sub-range 96 is correspondingly also selected in such a way that it covers the lower magnifications of total zoom range 90 as compared with second zoom sub-range 98, whereas second zoom sub-range 98 encompasses the higher magnifications of total zoom range 90.

The result thereby achieved is that for objectives 52 having a high magnification, i.e. a short focal length, high magnifications are also achieved by the zoom system, so that a high total magnification is achieved overall.

Conversely, with objectives 44 of low magnification, i.e. having a wide field angle, zoom sub-range 96, at which zoom system 32 again has low magnification and thus a wide field angle, is allocated.

The sub-range of zoom system 32 which is used is thus always matched to the properties of the respective objective 44, 52.

Figure 3:
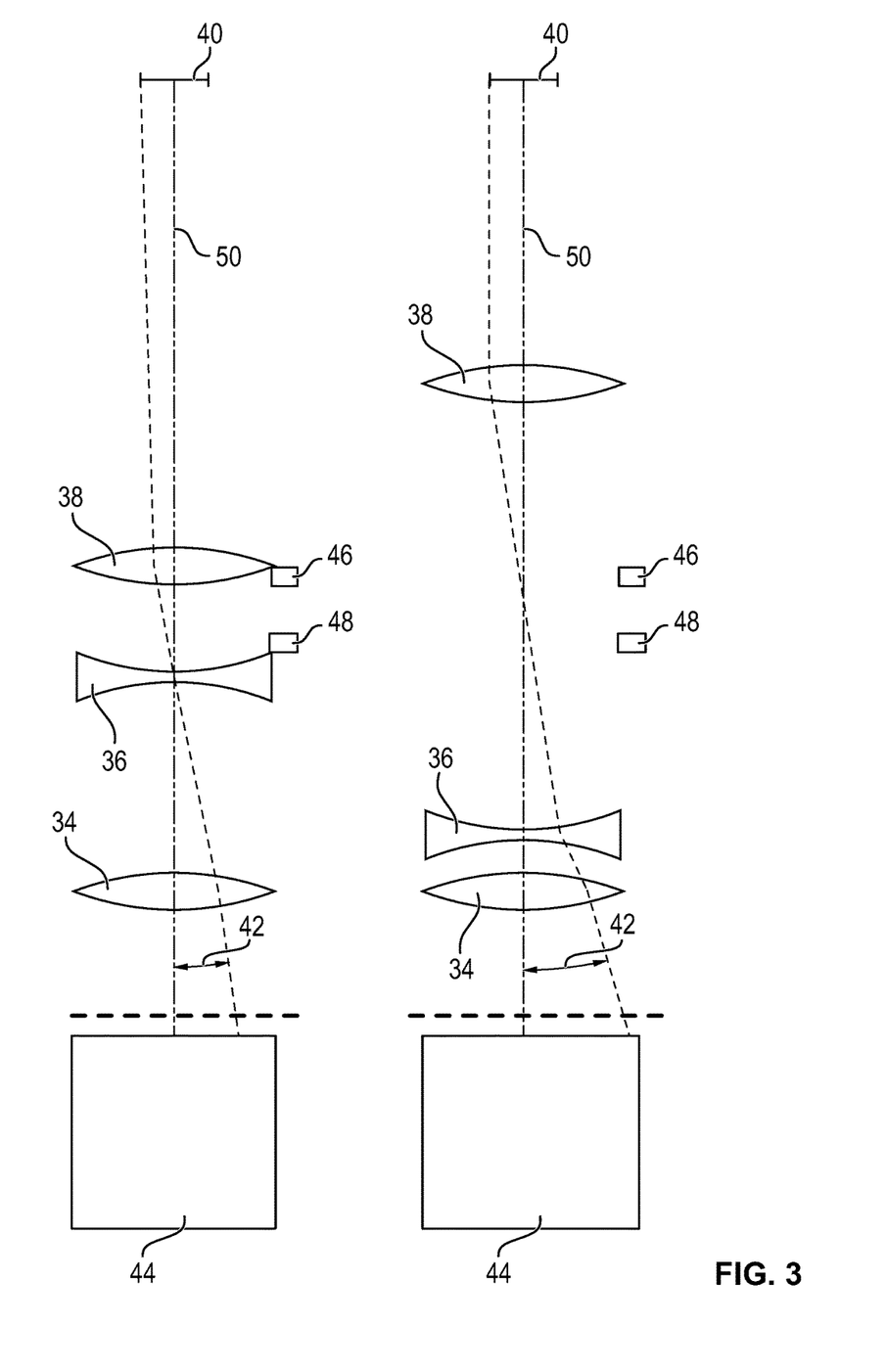
FIG. 3 schematically depicts a magnification system according to FIG. 2 when a first objective is in use.

FIG. 3 schematically depicts the magnification system of FIG. 2 in two states, first objective 44 of objective system 30 being introduced into the beam path. With first objective 44, which has a relatively long focal length, i.e. low magnification, the adjustability of zoom system 32 is limited by limiting elements 46, 48 in such a way that, compared with the maximum adjustment range shown in FIG. 2, adjustment is possible down to the minimum focal length (FIG. 3, right) but not up to the maximum focal length. An adjustment of zoom system 32 is correspondingly possible only within first zoom sub-range 96. The movement of lens groups 36, 38 toward one another is limited, via limiting elements 46, 48, to the state shown on the left in FIG. 3. Limiting elements 46, 48 are, in particular, stops that are coupled to first objective 44, so that upon introduction of first objective 44 into the beam path, stops 46, 48 are also automatically moved so they are arranged in such a way that they are arranged in the movement region of lens groups 34 to 38.

Figure 4:
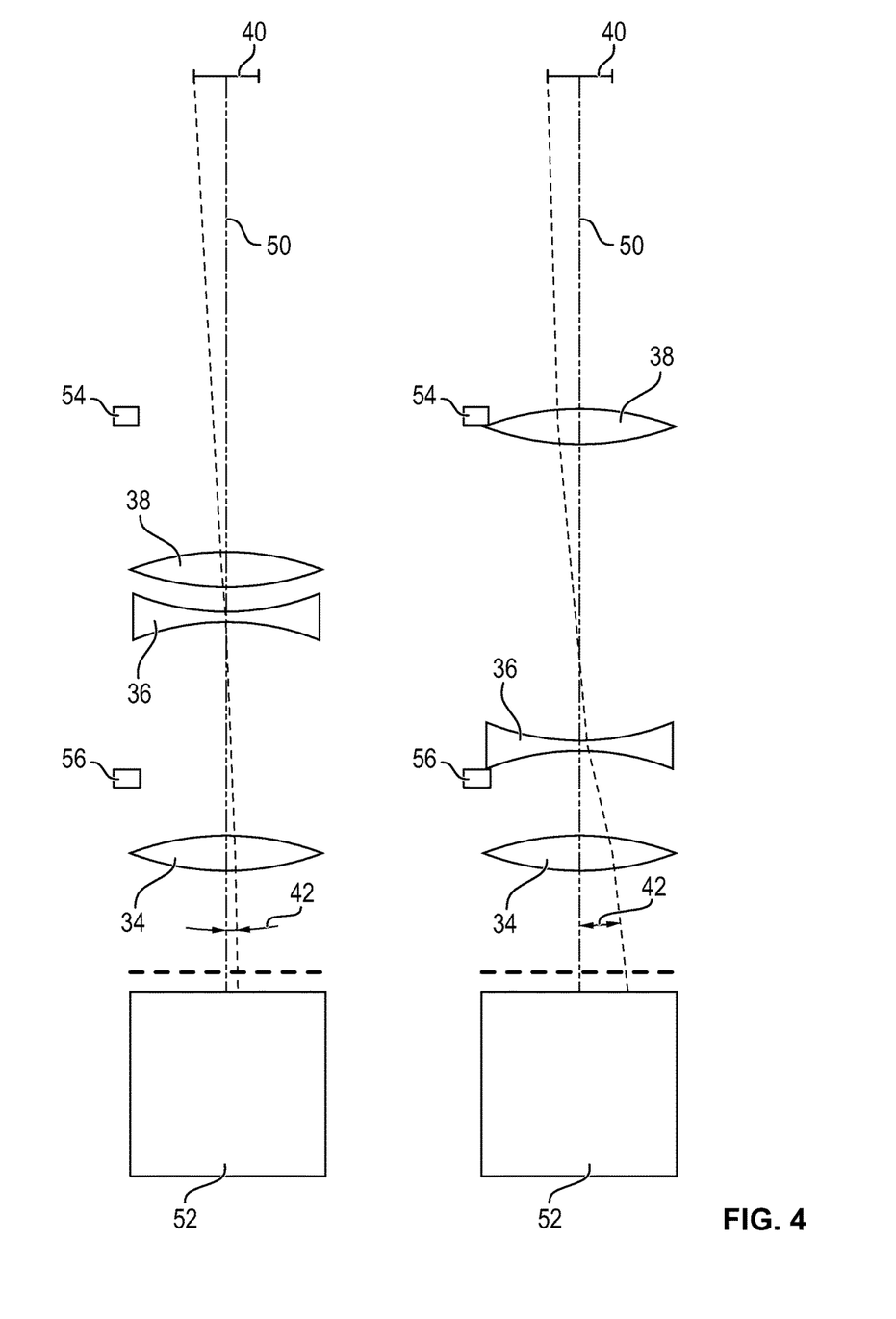
FIG. 4 schematically depicts a magnification system according to FIG. 2 when a second objective is in use.

FIG. 4 shows the case in which second objective 52 is pivoted into the beam path. This objective 52 as well again encompasses stops 54, 56 with which the adjustment of zoom system 32 can be limited to second zoom sub-range 98. With this second objective 52, stops 54, 56 prevent lens groups 36, 38 from being moved farther apart from one another than the state shown on the right in FIG. 4, so that setting of the minimum magnification is prevented.

As depicted in FIG. 5, zoom sub-ranges 96, 98 in which zoom system 32 is respectively operated are thus configured to be narrower than the maximum zoom range 90, and for that reason zoom system 32 is also referred to as "overdimensioned" or "oversized."

Depending on which objective 44, 52 is introduced into the beam path and thus currently being used, and depending on the setting of zoom system 32, a different aperture is required in order to obtain high-quality images of the object to be examined microscopically, which have the desired properties.

Figure 6:
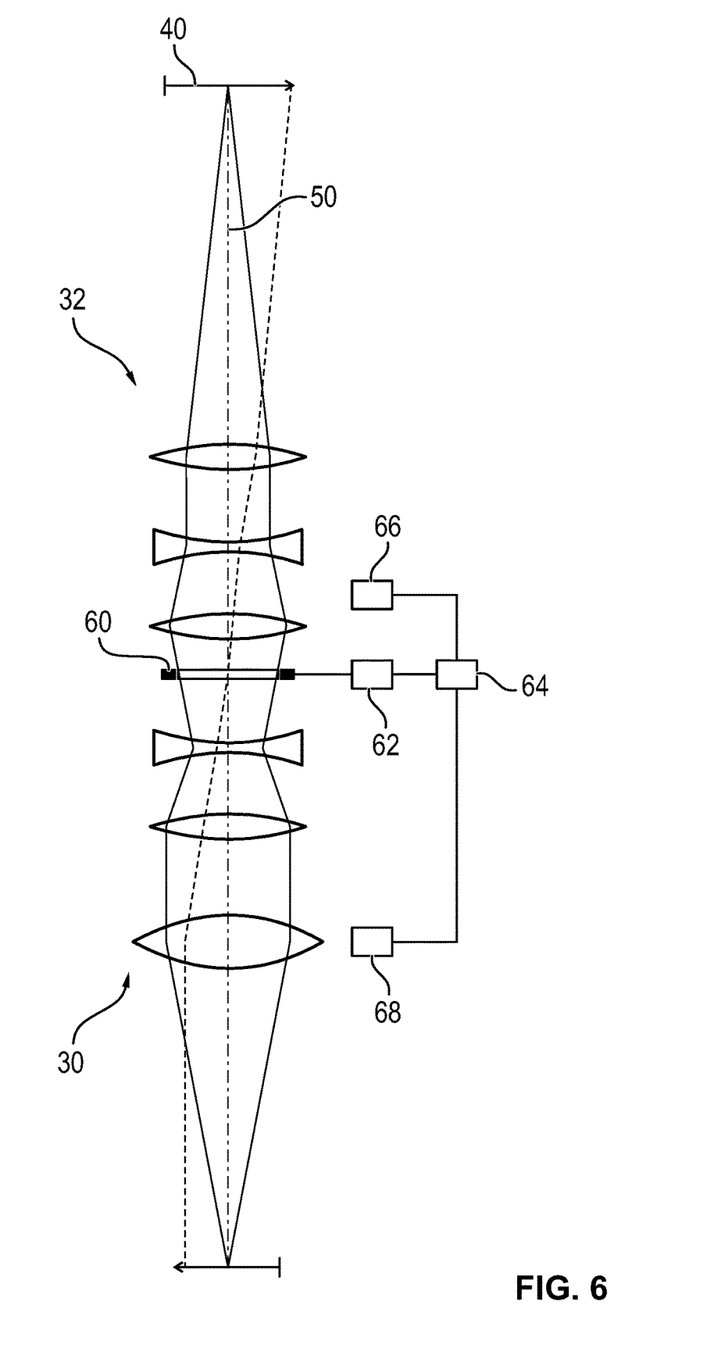
FIG. 6 schematically depicts a magnification system in accordance with a further embodiment.

FIG. 6 therefore shows an embodiment in which an aperture diaphragm 60, which is embodied in particular in the form of an iris diaphragm, is provided for setting the aperture. Alternatively, instead of an iris diaphragm it is also possible to use other types of diaphragm that allow the size of their opening, and thus the aperture, to be modified. A system of diaphragms can also be provided, encompassing several diaphragms that have different opening sizes and can be introduced selectably into the beam path depending on the aperture required.

Also provided is an electric drive unit 62, in particular a motor, with which diaphragm 60 can be adjusted, i.e. with which the size of diaphragm 60 can be adjusted.

Microscope 10 further encompasses a control unit 64 that applies control to motor 62 and that, via its control application signals, specifies to motor 62 that setting of diaphragm 60 which it is to set.

Control unit 64 is embodied in such a way that it ascertains, as a function of the respectively current manifestation or setting of zoom system 32 and of the objective 44, 54 that is currently introduced into the beam path of the microscope and is thus being used, that setting of diaphragm 60 which is to be set and is required in order to achieve the ideal aperture.

An allocation specification, which contains for each possible zoom setting and each possible objective, or for the combinations resulting therefrom, the respectively required setting of diaphragm 60, is stored in particular in control unit 64. Control unit 64 reads out the required setting of diaphragm 60 from this allocation specification as a function of the current settings, and applies control accordingly to motor 62 in such a way that it sets diaphragm 60 in accordance with the preset setting.

In a further embodiment, additionally or alternatively to an allocation specification a calculation specification, with which control unit 64 ascertains, as a function of the current manifestations or settings of zoom system 32 and of the selected objective 44, 52, the respectively ideal setting of diaphragm 60, can also be stored in control unit 64.

The ascertainment of the respective setting of diaphragm 60, and also the actual setting of that setting, are accomplished in particular fully automatically, with no need for the operator of microscope 10 to contribute anything for the purpose. The result thereby achieved is that the operator simply needs to implement the desired settings on zoom system 32 and objective system 30, and need not deal further with ascertaining the respectively required setting of diaphragm 60. An ideal aperture profile over the entire zoom range is thereby achieved. In addition, automatic ideal setting of the aperture of microscope 10 is achieved, along with simplified operation of microscope 10, less training time and a lower level of expert knowledge for the user, and less susceptibility to incorrect operation. Automatic setting of diaphragm 60 in this manner furthermore enables fast and precise adjustment of the aperture, which is advantageous in terms of rapid sequential acquisition of images of the same object at different apertures.

Microscope 10 encompasses in particular a first sensor 66 with which the current manifestations or setting of zoom system 32 can respectively be ascertained. The ascertained current setting is transferred in particular to control unit 64, so that the latter knows at all times how zoom system 32 is set and can thus ideally adapt diaphragm 60 in each case. First sensor 66 can be, for example, a Hall sensor with which the rotational position of the spindle for adjusting lens groups 34 to 38 of zoom system 32, and thus the manifestations of zoom system 32, can be ascertained.

Analogously, in particular a second sensor 68 is provided with which the manifestation of objective system 30 can be ascertained, i.e. which of the objectives 44, 52 of objective system 30 is currently introduced into the beam path. This information as well is conveyed to control unit 64 so that upon a change of objective 44, 52 said unit can respectively automatically adapt the setting of diaphragm 60. In particular, each objective 44, 52 comprises a contact, the contact of objective 44, 52 that is introduced into the beam path being in contact with a contact of sensor 68 so that the latter can easily ascertain which objective 44, 52 is currently introduced into the beam path.

Sensors 66 and 68 are necessary in particular when the adjustment of zoom system 32 and of objective system 30 is accomplished entirely mechanically and manually, since in this case no electronic data, having information regarding the current settings, are available. Conversely, if the adjustment of zoom system 32 and of objective system 30 is accomplished with the aid of electronically controlled units, the control units utilized for that can be used by control unit 64 to ascertain the setting of zoom system 32 and of objective system 30, so that no sensors 66, 68 are required.

In alternative embodiments, control unit 64 can also take into consideration only the setting of zoom system 32, or only the setting of objective system 30, when ascertaining the setting of diaphragm 60.

It is furthermore alternatively possible for further parameters also to be taken into consideration by control unit 64 in the context of automatic setting of diaphragm 60. For example, properties of components of microscope 10 can be taken into consideration. In particular, the resolution and/or sensitivity of image acquisition unit 40 can also be taken into consideration by control unit 64. This is useful in particular if individual components need to be exchanged, for example because they are external components.

User preferences and user settings can furthermore be used as further parameters as a function of which control unit 64 ascertains that setting of diaphragm 60 which is to be set. In particular, the operator can select various preferences or settings in clear text on a computer connected to microscope 10. For example, an operator can indicate that he or she wishes a constant brightness or expanded resolution. The operator can furthermore select, for example via a menu item, "better resolution" or "greater depth of focus." A different aperture is required in each case depending on the preferences and settings, and control unit 64 automatically takes into consideration those preferences and settings, selected in clear text, when ascertaining the required setting of diaphragm 60, and automatically sets diaphragm 60 so that the user does not him- or herself need to set the diaphragm experimentally in accordance with his or her preferences, but instead everything is accomplished automatically by control unit 64.

The above-described automatic electronic setting of the diaphragm as a function of different parameters of microscope 10 can of course also be used for all other types of microscope, i.e. not only for microscopes having an "oversized" zoom system.

In an alternative embodiment, a liquid-crystal matrix having a two-dimensional grid of LCD segments (a so-called "LC shutter") can also be used instead of iris diaphragm 60. With this embodiment, motor 62 can be omitted. Instead, control unit 64 applies control directly to the liquid-crystal matrix and activates and deactivates the LCD segments accordingly.

PARTS LIST

10 Microscope
12 Stand body
14 Pivoting unit
16 Housing
18 Specimen stage
20 Positioning wheel
30 Objective system
32 Zoom system
34, 36, 38 Lens group
40 Image capture unit
42 Field angle
44, 52 Objective
46, 48, 54, 56 Limiting element
50 Optical axis
60 Diaphragm
62 Motor
64 Control unit
66, 68 Sensor
90 Total zoom range
92 Lower limit
94 Upper limit
96, 98 Zoom sub-range
P1 Direction

What is claimed is:

1. A microscope including a beam path having an aperture, the microscope comprising:
   an objective system (30) that has at least two objectives (44, 52), selectably introducible into the beam path, having different focal lengths;
   a zoom system (32) having a total zoom range (90), a respective total magnification of an object to be examined microscopically resulting respectively from the focal length of a selected objective (44, 52) and from the magnification of the zoom system (32) set within the total zoom range (90), wherein the total zoom range (90) includes a plurality of zoom sub-ranges (96, 98) within the total zoom range (90), and each of the plurality of zoom sub-ranges (96, 98) corresponds to a different respective one of the objectives (44, 52);
   a diaphragm (60) for limiting the aperture of the beam path;
   a control unit (64) for controlling the diaphragm (60), the control unit (64) being configured for automatically ascertaining, as a function of a current value of at least one parameter of the microscope, a respective desired setting of the diaphragm (60) to be set for the current value, wherein the at least one parameter of the microscope includes the focal length of the selected objective and/or a current focal length of the zoom system (32), and the control unit (64) being configured for setting the diaphragm (60) to the respective desired setting; and
   limiting means (46, 48, 54, 56) for limiting adjustment of the zoom system (32) to the zoom sub-range (96, 98) corresponding to the selected objective (44, 52).

2. The microscope (10) according to claim 1, wherein the microscope (10) further comprises a motor (62) for adjusting the diaphragm (60) to set a size of an opening of the diaphragm (60); and the control unit (64) is configured to automatically apply control to the motor (62) to set the diaphragm (60) to the respective desired setting.

3. The microscope (10) according to claim 1, wherein the diaphragm (60) is an iris diaphragm.

4. The microscope (10) according to claim 1, wherein the at least one parameter of the microscope (10) includes at least two parameters of the microscope (10).

5. The microscope (10) according to claim 1, wherein the control unit (64) includes a plurality of desired settings of the diaphragm (60) stored therein, wherein the plurality of desired settings correspond to all possible values of the parameters taken into consideration by the control unit (64).

6. The microscope (10) according to claim 1, wherein the control unit (64) includes a calculation specification stored in the control unit (64); and the control unit (64) is configured to ascertain, with the aid of the calculation specification, the desired setting of the diaphragm (60).

7. The microscope (10) according to claim 1, wherein the at least one parameter of the microscope includes the current focal length of the zoom system (32).

8. The microscope (10) according to claim 1, wherein the at least one parameter of the microscope includes the focal length of the selected objective.

9. The microscope (10) according to claim 1, wherein the at least one parameter of the microscope includes at least one property of at least one hardware component (40) of the microscope (10).

10. The microscope (10) according to claim 9, wherein the at least one property of at least one hardware component (40) of the microscope (10) includes a resolution of an image capture unit (40) of the microscope (10), a sensitivity of the image capture unit (40) of the microscope (10), a resolution of a camera of the microscope (10), and/or a sensitivity of the camera of the microscope (10).

11. The microscope (10) according to claim 1, wherein the at least one parameter of the microscope includes at least one user setting of a user of the microscope (10).

12. The microscope according to claim 11, wherein the at least one user setting includes a desired exposure time, a desired resolution level, a desired depth-of-focus level, and/or a desired brightness level.

13. The microscope (10) according to claim 1, further comprising at least one sensor unit (66, 68) for ascertaining the current value of each of the at least one parameter of the microscope.

14. The microscope (10) according to claim 1, wherein the microscope (10) is a digital microscope comprising an image capture unit (40) on which an image of the object to be examined microscopically is imaged with the aid of the zoom system (32).

* * * * *